(12) United States Patent
Kinugasa

(10) Patent No.: US 8,139,143 B2
(45) Date of Patent: Mar. 20, 2012

(54) SOLID-STATE IMAGING APPARATUS AND CAMERA SYSTEM

(75) Inventor: Tomohisa Kinugasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 12/607,205

(22) Filed: Oct. 28, 2009

(65) Prior Publication Data

US 2010/0134669 A1   Jun. 3, 2010

(30) Foreign Application Priority Data

Nov. 28, 2008   (JP) ................... 2008-304491

(51) Int. Cl.
*G03B 13/00*   (2006.01)
*G03B 3/00*   (2006.01)
*H04N 5/232*   (2006.01)

(52) U.S. Cl. ......................... 348/350; 396/128

(58) Field of Classification Search ................ None
See application file for complete search history.

(56) References Cited

U.S. PATENT DOCUMENTS

| | | | | |
|---|---|---|---|---|
| 3,838,275 A * | 9/1974 | Stauffer | ................ | 250/204 |
| 4,264,810 A * | 4/1981 | Utagawa et al. | ........... | 250/204 |
| 6,781,624 B1 * | 8/2004 | Takahashi | ................ | 348/241 |
| 6,973,265 B2 * | 12/2005 | Takahashi | ................ | 396/121 |
| 7,164,447 B2 * | 1/2007 | Takahashi | ................ | 348/350 |
| 7,221,400 B2 * | 5/2007 | Takahashi et al. | ........... | 348/350 |
| 7,454,133 B2 * | 11/2008 | Takahashi | ................ | 396/96 |
| 7,643,743 B2 * | 1/2010 | Inoue et al. | ................ | 396/96 |

FOREIGN PATENT DOCUMENTS

JP   2000-180706   6/2000

* cited by examiner

*Primary Examiner* — Justin P Misleh
(74) *Attorney, Agent, or Firm* — Fitzpatrick, Cella, Harper & Scinto

(57) ABSTRACT

A solid-state imaging apparatus has a plurality of read out circuits (128) reading out pixel output signals from pixels in a pixel region, a common signal output line (123) connected to the plurality of read out circuits via switch units, a first load unit (124) connected to the signal output line and a positive power source, a second load unit (125) connected to the signal output line and a ground power source, a maximum value output unit outputting a maximum value of a plurality of pixel signals input to the read out circuits, a minimum value output unit outputting a minimum value of a plurality of pixel signals input to the read out circuits, and a switching unit switching output of the maximum value output unit and output of the minimum value output unit during a pixel signal accumulation period.

8 Claims, 6 Drawing Sheets

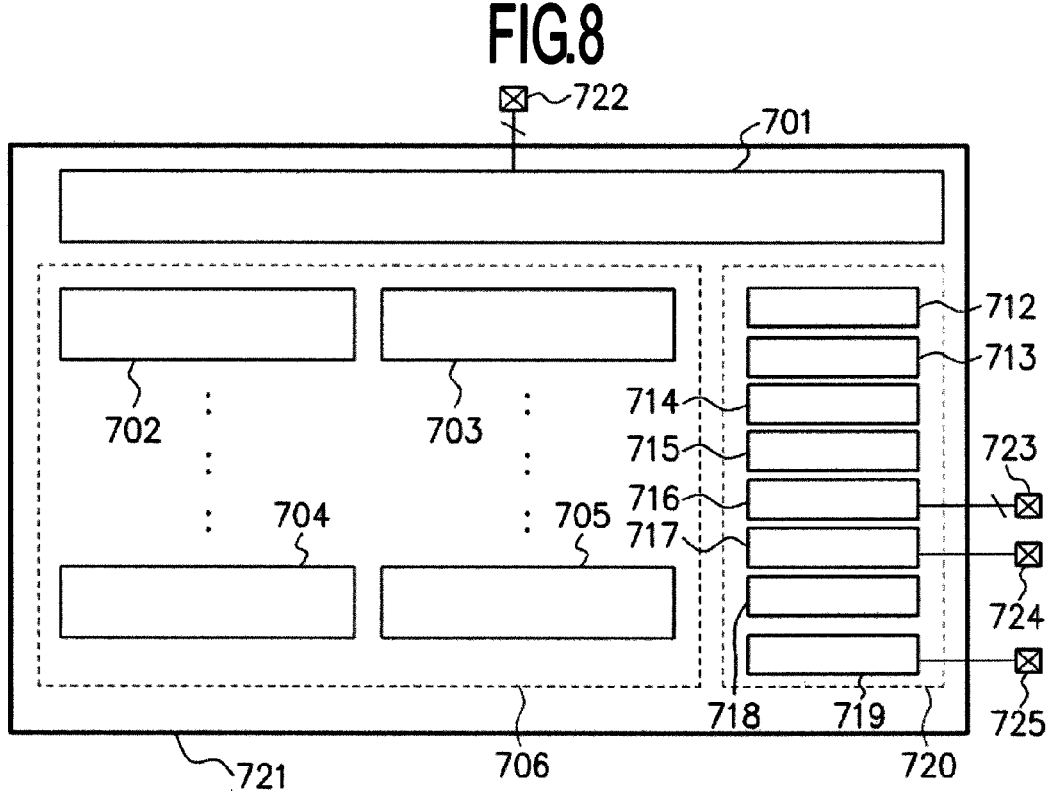
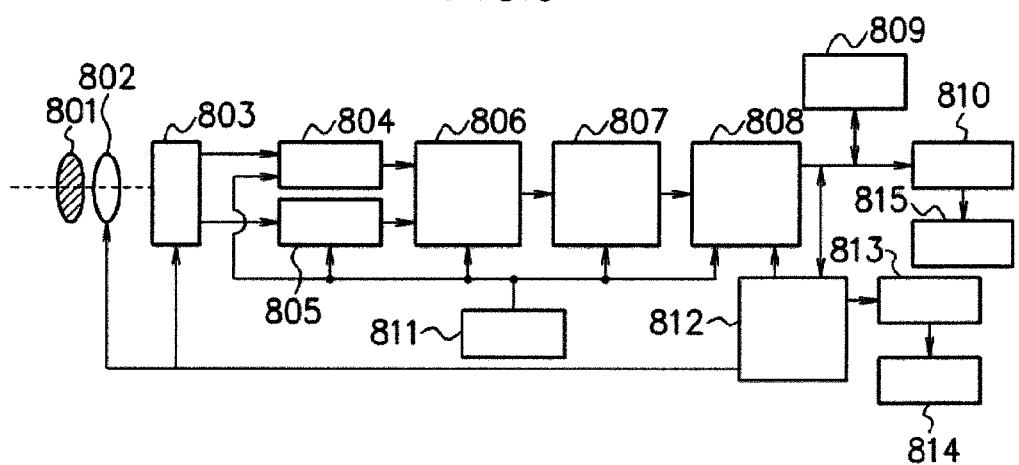

SOLID-STATE IMAGING APPARATUS AND CAMERA SYSTEM

BACKGROUND OF THE INVENTION

1. Field of the Invention

The present invention relates to a solid-state imaging apparatus and a camera system.

2. Description of the Related Art

As a focus detecting apparatus for auto focusing (hereinafter, called AF), there is a phase difference detection type which detects a lateral displacement of a luminance signal in two sets of photoelectric conversion element rows. In order to enhance focusing precision and focusing speed of focusing detection, a method of performing accumulation control by processing the maximum value and the minimum value from an output signal of each of the photoelectric conversion elements of photoelectric conversion element rows is used (hereinafter, called Peak Bottom: a PB method). As in the imaging apparatus described in Japanese Patent Application Laid-Open No. 2000-180706, in the PB method, a maximum value processing circuit (hereinafter, called a peak amplifier) and a minimum value processing circuit (hereinafter, called a bottom amplifier) are needed. As described in Japanese Patent Application Laid-Open No. 2000-180706, the peak amplifier and the bottom amplifier include differential input stages and source follower output units. Further, each of the peak amplifier and bottom amplifier includes one clamp capacitor, and performs offset reduction of each of the amplifiers by using each of the clamp capacitors.

As the operation of the imaging apparatus, offset reduction of the aforementioned amplifiers is performed in an offset reduction period for reducing offset. Subsequently, in an accumulation period, accumulation into the photoelectric conversion elements is performed, and control of outputting the maximum value and the minimum value among a plurality of photoelectric conversion elements is performed. After accumulation is finished, optical signals based on the electric charges accumulated in each of the photoelectric conversion elements are sequentially output.

SUMMARY OF THE INVENTION

In recent years, in order to meet the requirement for further enhancement in focusing precision, the number of photoelectric conversion elements provided on an auto focusing sensor (hereinafter, called an AF sensor) has been increasing. However, the peak amplifier and bottom amplifier including clamp capacitors occupy a large part of the chip area and current consumption of the AF sensor, and increase in the chip area and power consumption hinders further enhancement in precision.

An object of the present invention is to provide a solid-state imaging apparatus and a camera system which can realize reduction in a layout area and current consumption.

In order to achieve the above object the present invention provides a solid-state imaging apparatus comprising: a plurality of photoelectric conversion units; a plurality of read out circuits arranged correspondingly to each of the plurality of photoelectric conversion units, wherein each of the plurality of read out circuits includes a maximum value output unit for outputting a maximum value among a plurality of pixel signals input to the readout circuits from the corresponding photoelectric conversion units, and a minimum value output unit for outputting a minimum value among a plurality of pixel signals input to the readout circuits from the corresponding photoelectric conversion units; a signal output line connected commonly to outputs of the plurality of read out circuits; and a switching unit for switching between an output from the maximum value output unit and an output from the minimum value output unit, during a period of accumulating a pixel signal Further, a camera system of the present invention is characterized by having the above described solid-state imaging apparatus, a lens for gathering an incident light onto the solid-state imaging apparatus, a driving signal generator circuit for supplying a driving signal to the solid-state imaging apparatus.

By switching the output of the maximum value output unit and the output of the minimum value output unit during a pixel signal accumulation period, a layout are and current consumption can be reduced. As a result, a compact solid-imaging apparatus with lower power consumption can be provided.

Further features of the present invention will become apparent from the following description of exemplary embodiments with reference to the attached drawings.

BRIEF DESCRIPTION OF THE DRAWINGS

FIG. 8 is a block diagram of an integrated circuit according to a fourth embodiment of the present invention.

FIG. 9 is a block diagram of a camera system according to a fifth embodiment of the present invention.

DESCRIPTION OF THE EMBODIMENTS

First Embodiment

Figure 1:
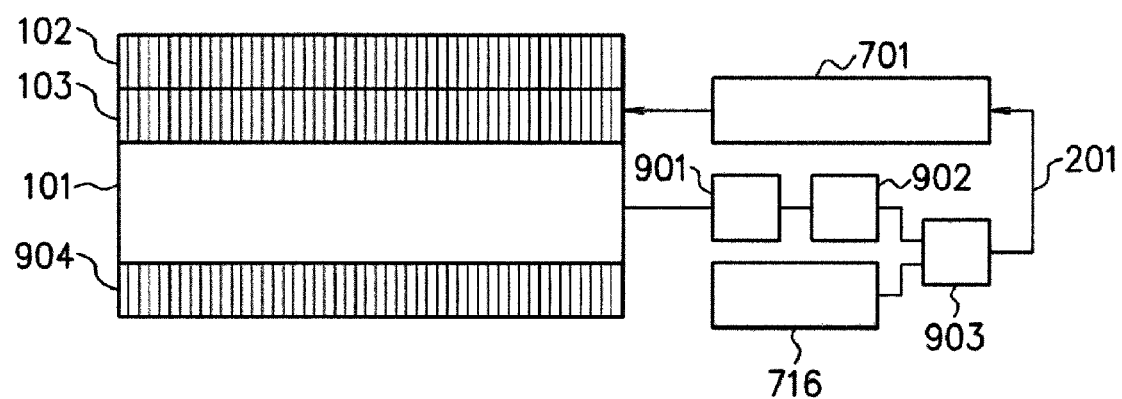
FIG. 1 is a block diagram illustrating a configuration example of a solid-state imaging apparatus (AF sensor) provided with a signal processing apparatus according to a first embodiment of the present invention.

FIG. 1 is a block diagram illustrating a configuration example of a solid-state imaging apparatus (AF sensor) provided with a signal processing apparatus according to a first embodiment of the present invention. In FIG. 1, the solid-state imaging apparatus includes a signal processing apparatus 101, a pixel region 102 configured by a plurality of pixels (photoelectric conversion units) having photoelectric conversion elements (photoelectric conversion units), a first signal holding unit 103, an AGC comparator signal 201, a logic block 701, a reference voltage and current generator circuit 716, a second signal holding unit 901, a PB processing unit 902, a comparator 903 and a shift register 904.

Though not illustrated here, the outputs of the respective photoelectric conversion elements are connected to different input terminals of the signal processing apparatus 101 via the first signal holding unit 103. Further, the photoelectric conversion unit 102 and the first signal holding unit 103 are one-dimensionally disposed, and form a linear sensor. The second signal holding apparatus 901 and the PB processing unit 902, and the comparator 903 are automatic gain control circuits (Auto Gain Control: AGC) which perform accumulation control of the linear sensor.

With use of FIG. 1, an operation of the solid-state imaging apparatus (AF sensor) will be described. First, after each of the blocks is initialized, the photoelectric conversion unit 102 performs photoelectric conversion, and starts an operation of accumulating charges. The electric signal from each of the photoelectric conversion elements which is obtained in the photoelectric conversion unit 102 is held in the first signal holding unit 103. At the same time, the electric signal from each of the photoelectric conversion elements is input to each of the input terminals of the signal processing apparatus 101. During a period of accumulating charges, the signal processing apparatus 101 connects to output a maximum value and a minimum value alternately out of the signals from the respective photoelectric conversion elements. Both or any one of the maximum value and the minimum value which are output from the signal processing apparatus 101 are or is held by the second signal holding unit 901. The PB processing unit 902 obtains a difference between the maximum value and the minimum value from the maximum value and the minimum value held by the second signal holding unit 901, and outputs the difference to the comparator 903. The comparator 903 compares an accumulation termination level generated by the reference voltage and current generator circuit 716 and the output of the PB processing unit 902. When the difference between the maximum value and the minimum value reaches the accumulation termination level, the comparator 903 is inverted, and the AGC comparator signal 201 is transmitted to the logic block 701. The logic block 701 receives the AGC comparator signal 201 and determines whether it raises the accumulation termination level and connects accumulation, or terminates the accumulation. The determination can be selected by external communication. When determining to terminate accumulation, the logic block 701 controls the first signal holding unit 103 to hold signals.

After accumulation is terminated, the shift register 904 transmits a read pulse signal to the signal processing apparatus 101. The signal processing apparatus 101 sequentially outputs the signal values held in the first signal holding unit 103 in correspondence with the read pulse. Proper gains are applied to the signals sequentially output, and the signals are output from the sensor.

Figure 2:
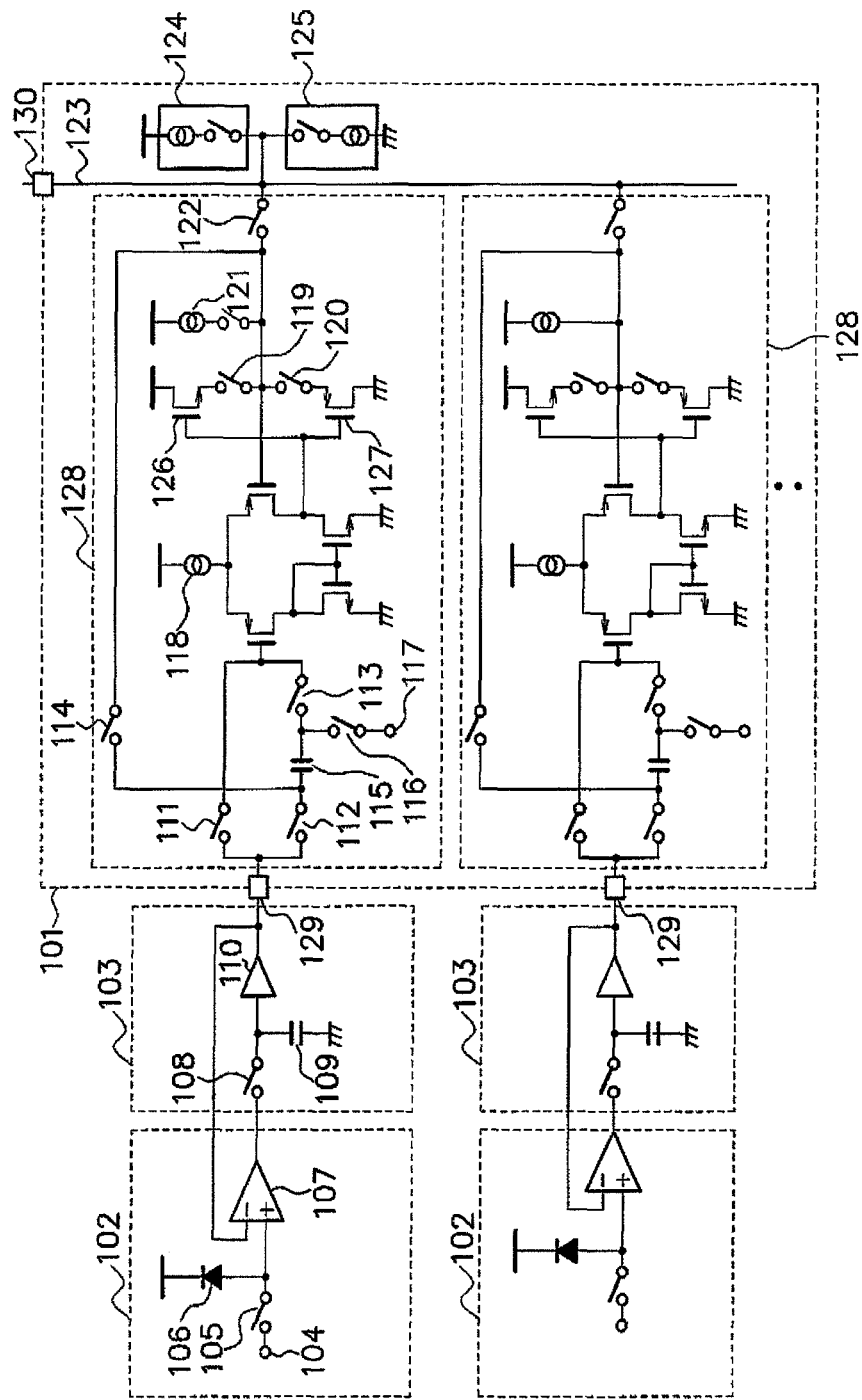
FIG. 2 is a circuit diagram illustrating the solid-state imaging apparatus according to the first embodiment of the present invention.

FIG. 2 is a circuit diagram illustrating the solid-state imaging apparatus of FIG. 1 more concretely. In FIG. 2, the solid-state imaging apparatus includes the signal processing apparatus 101, the photoelectric conversion unit 102, the first signal holding unit 103, a reset voltage 104, a reset switch (SW_RST) 105 which resets a photodiode (photoelectric conversion element) 106, the photodiode (photoelectric conversion element) 106, a differential amplifier 107, a signal holding switch (SW_HOLD) 108, a signal holding capacitor 109, a buffer amplifier 110, a first noise clamp switch (SW_N1) 111, a signal output switch (SW_S1) 112, a second signal output switch (SW_S2) 113, a second noise clamp switch (SW_N2) 114, a clamp capacitor 115, a clamp switch (SW_CLAMP) 116, a clamp voltage 117, a differential stage current source 118, a first source follower output switch (SW_SF1) 119, a second source follower output switch (SW_SF2) 120, a clamp current source 121, a switch (SW_SR) 122 driven by the shift register 904, an output line 123 of the signal processing apparatus 101, a first current load circuit 124, a second current load circuit 125, a maximum value output NMOS transistor 126, a minimum value output PMOS transistor 127, an amplifier circuit 128, an input terminal 129 and an output terminal 130.

FIG. 2 illustrates the configuration in which two of the photoelectric conversion units 102 and two of the first signal holding units 103 are included, and each of the first signal holding units 103 is connected to each of the input terminals 129 of the signal processing apparatus 101. However, the configuration having three or more input terminals in accordance with the number of photoelectric conversion units 102 can be adopted. Further, one amplifier circuit 128 is connected to each of the input terminals 129, and the signal processing apparatus 101 has two of the amplifier circuits 128 in the configuration of FIG. 2.

Next, how to calculate the maximum value and the minimum value of the input signal of the signal processing apparatus 101 will be described. When the signal processing apparatus 101 outputs the maximum value, all the first source follower output switches 119, all the switches 122 and the switch which connects the current source included in the second current load circuit 125 and the output line 123 are turned on. All the second source follower output switches 120, all the clamp current sources 121 and the switch which connects the current source included in the first current load circuit 124 and the output line 123 are turned off. In this manner, only the maximum value output NMOS transistor 126 with input at the highest voltage of all the input terminals is turned on, and the other maximum value output NMOS transistors 126 are cut off. Thereby, the maximum value of the input signal is output from the output line 123.

When the signal processing apparatus 101 outputs the minimum value, all the second source follower output switches 120, all the switches 122 and the switch which connects the current source included in the first current load circuit 124 and the output line 123 are turned on. All the first source follower output switches 119, all the clamp current sources 121 and the switch which connects the current source included in the second current load circuit 125 and the output line 123 are turned off. More specifically, the polarity is reversed from the aforementioned case of outputting the maximum value, and only the minimum value output PMOS transistor 127 with input at the lowest voltage is turned on out of all the input terminals, and the other minimum value output PMOS transistors 127 are cut off. Thereby, the minimum value of the input signal is output from the output line 123. Here, the minimum value output PMOS transistor 127 can be replaced with a PNP transistor, and the maximum value output NMOS transistor 126 can be replaced with an NPN transistor, respectively.

Figure 3:
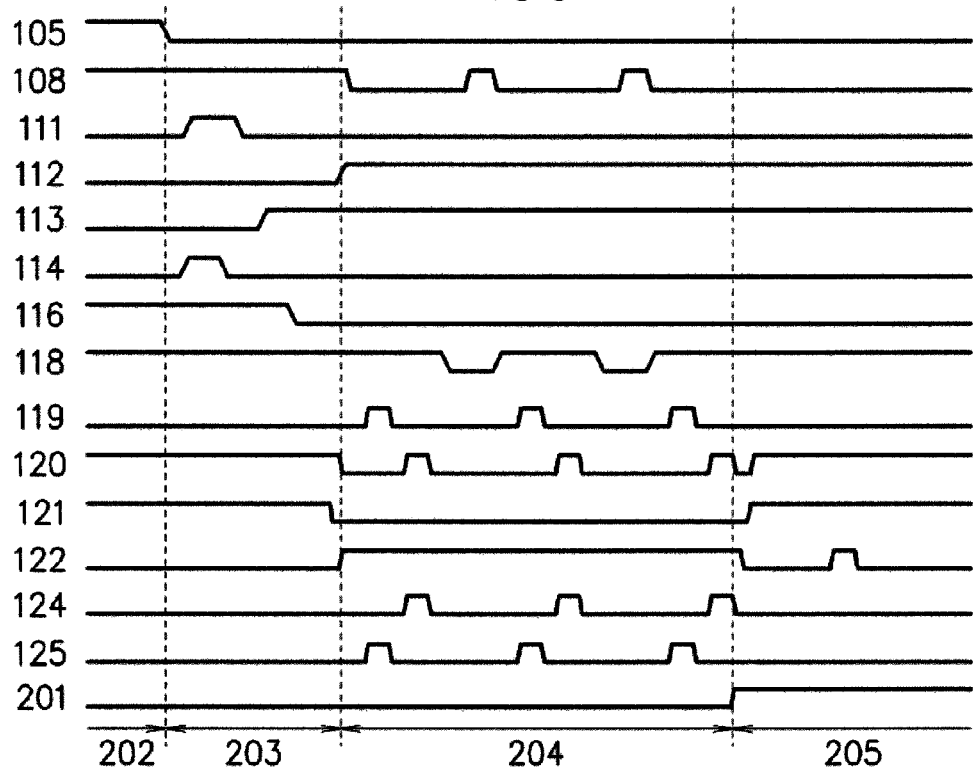
FIG. 3 is a timing chart illustrating the solid-state imaging apparatus of the first embodiment of the present invention.

FIG. 3 is a diagram showing a drive timing of the circuit of FIG. 2. The signal denoted by the same reference numeral as that of FIG. 2 represents the signal controlling each of the components of the circuit denoted by the same reference numeral in FIG. 2. The other reference numeral 201 denotes an ACG comparator signal, 202 denotes a reset period, 203 denotes an offset cancel period, 204 denotes an accumulation period and 205 denotes a read out period.

Hereinafter, with use of FIGS. 2 and 3, an operation of the signal processing apparatus according to the present embodiment will be described. Hereinafter, when each signal is at a high level, each component is electrically connected (on), and when each signal is at a low level, each component is electrically disconnected (off).

In the reset period 202, the reset switch 105 is turned on, and the photodiode 106 is reset to the reset voltage 104. Next, in the offset cancel period 203, the reset switch 105 is turned off. Subsequently, the first noise clamp switch 111, the first signal output switch 112, the second signal output switch 113, the second noise clamp switch 114 and the clamp switch 116 perform on-off operations as in FIG. 3. Thereby, offsets of the differential amplifier 107, the buffer amplifier 110 and the amplifier circuit 128 are held in the clamp capacitor 115.

In the offset cancel period 203, any one of the first source follower output switch 119 and the second source follower output switch 120 is turned on. In order to enhance precision of AF, it is desirable to reduce the offset of the amplifier circuit 128 in the case of individually reading out the charge (hereinafter, called each input signal) from each of the photoelectric conversion elements 106. Accordingly, the offset is desirably cancelled by turning on the same switch as the switch used when each of the input signals is sequentially read out of the first source follower output switch 119 and the second source follower output switch 120. The present embodiment describes the case of sequentially reading out each of the input signals by using the minimum value output PMOS transistor 127. When each of the input signals is sequentially read out by using the maximum value output NMOS transistor 126, the polarity of the clamp current source 121 is reversed from that of the present embodiment.

In the accumulation period 204, the combination of the first source follower output switch 119 and the second current load circuit 125, and the combination of the second source follower output switch 120 and the first current load circuit 124 are turned on in different time periods respectively. The method for outputting the maximum value and the minimum value in FIG. 2 is described above, and by performing such a driving method, the maximum value and the minimum value of the input signal can be alternately output from the output terminal of the signal processing apparatus 101 in different time periods. In FIG. 3, the maximum values and the minimum values are output three times, but if the accumulation time becomes long in the aforementioned accumulation control operation, the maximum values and the minimum values are output a larger number of times, and if the accumulation time becomes short on the contrary, they are output a smaller number of times.

Here, in the accumulation period 204, accumulation of charges is advanced while the maximum value and the minimum value are alternately output, and therefore, there is the problem that the accumulation signal at the time of outputting the maximum value and the accumulation signal at the time of outputting the minimum value differ from each other. Thus, in the period in which the maximum value and the minimum value are not output, the signal holding switch 108 is turned on as shown in FIG. 3 to sample the accumulation signal, and in the period in which the maximum value and the minimum value are output, the signal holding switch 108 is turned off so that the accumulation signal is held in the signal holding capacitor 109. In this manner, the maximum value and the minimum value of the same accumulation signal which is held can be output.

Further, in the period in which the maximum value and the minimum value are not output, the differential stage current source 118 is turned off, and thereby, the current consumption can be reduced. The accumulation control operation in the accumulation period 204 is described above, and therefore, the description of it is omitted.

Next, an operation of the read out period 205 will be described. The second source follower output switch 120 which is turned on in the offset cancel period 203 as described above, and the clamp current source 121 are turned on. The switch 122 is sequentially turned on by the shift register 904, and each of the input signals is sequentially output from the output terminal 130 of the signal processing apparatus 101.

As described above, the differential stage and the clamp capacitor 115 of the peak amplifier and the bottom amplifier of the signal processing apparatus 101 are commonly owned, and the maximum value and the minimum value are alternately output in the different time periods in the accumulation period, whereby the layout area and the current consumption can be reduced. Further, by turning off the differential stage current source 118 in the period in which the maximum value and the minimum value are not output, the current consumption can be further reduced.

Second Embodiment

Figure 4:
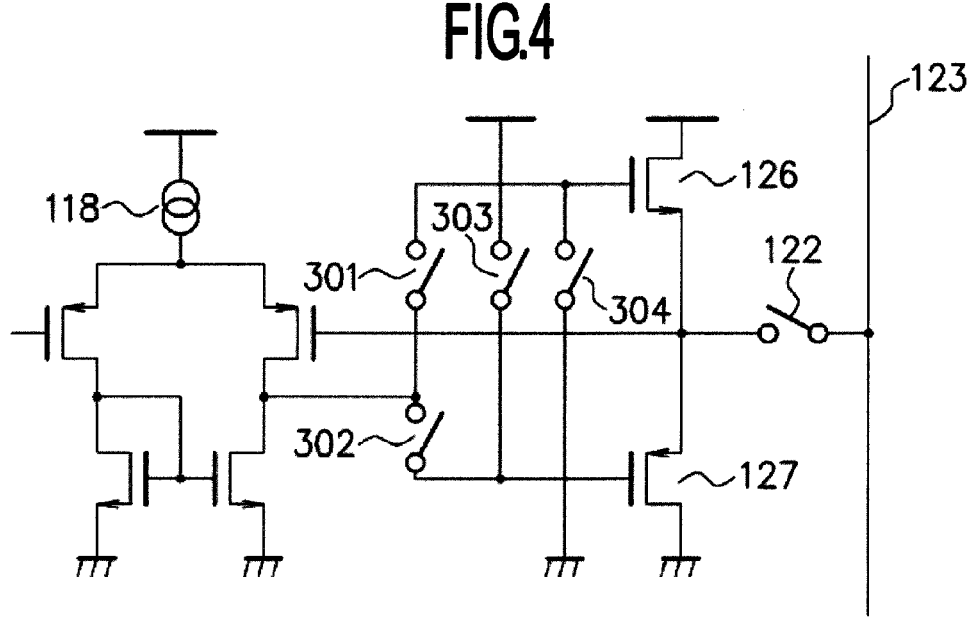
FIG. 4 is a circuit diagram illustrating a maximum value and minimum value detection circuits according to a second embodiment of the present invention.

FIG. 4 is a circuit diagram illustrating a maximum value and minimum value detection circuits in the amplifier circuit 128 according to a second embodiment of the present invention. FIG. 4 illustrates only a differential stage and a source follower output stage of the amplifier circuit 128, and the output line. The parts which are not illustrated in FIG. 4 are the same as those in FIG. 2. The amplifier circuit 128 includes a third source follower input switch (SW_SF3) 301, a fourth source follower input switch (SW_SF4) 302, a fifth source follower input switch (SW_SF5) 303 and a sixth source follower input switch (SW_SF6) 304.

Figure 5:
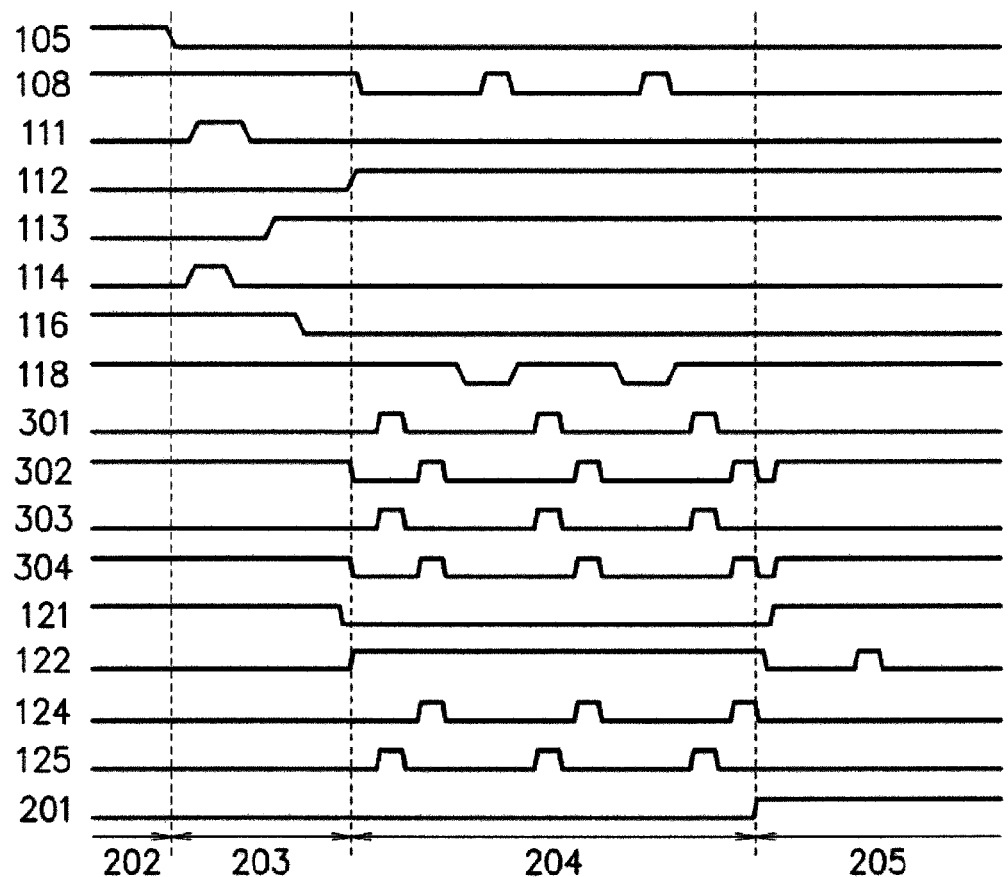
FIG. 5 is a timing chart illustrating the maximum value and minimum value detection circuits according to the second embodiment of the present invention.

FIG. 5 is a diagram showing a driving timing of the circuit of FIG. 4. Similarly to the first embodiment, in the reset period 202 and the offset cancel period 203, the source follower MOS transistor which is used in the read out period is turned on. In this embodiment, the fourth source follower input switch 302 and the sixth source follower input switch 304 are turned on. In the accumulation period 204, the maximum value and the minimum value of the input signal of the signal processing apparatus 101 are output in different time periods, and accumulation control is performed, as in the first embodiment.

In the present embodiment, at the time of switching the PMOS transistor and the NMOS transistor of the source follower of the amplifier unit, the gate voltage of the MOS transistor is switched. By adopting this configuration, the switch between the source terminal of the source follower and the output line can be deleted, and therefore, an RC time constant delay which occurs due to the on resistance of the switch and the parasitic capacitance of the wiring can be reduced. As a result, the speed of output of the maximum value and the minimum value can be enhanced.

As described above, the differential stage and the clamp capacitor 115 of the peak amplifier and the bottom amplifier of the signal processing apparatus 101 are commonly owned, and the maximum value and the minimum value are alternately output in the different time periods in the accumulation period 204, whereby the layout area and the current consumption can be reduced. Further, by adopting this configuration, an RC time constant delay which occurs due to the on resistance of the switch and the parasitic capacitance of the wiring can be reduced, and the speed of output of the maximum value and the minimum value can be enhanced.

Third Embodiment

Figure 6:
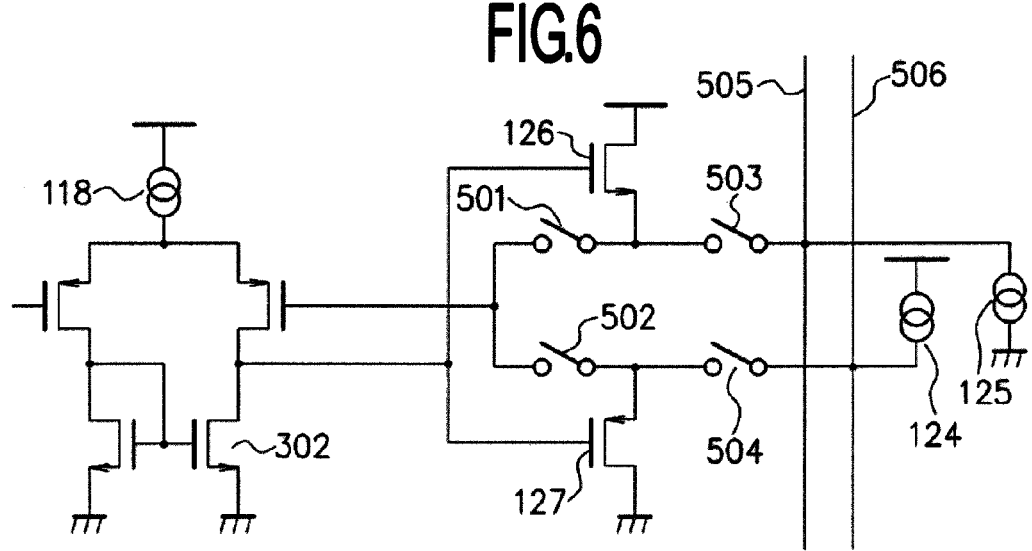
FIG. 6 is a circuit diagram illustrating a solid-state imaging apparatus according to a third embodiment of the present invention.

FIG. 6 is a circuit diagram illustrating a solid-state imaging apparatus according to a third embodiment of the present invention. FIG. 6 illustrates only a differential stage and a source follower output stage of the amplifier circuit 128, and output lines. The parts which are not illustrated in FIG. 6 are the same as those of FIG. 2. The amplifier circuit 128 includes a first differential stage feedback switch (SW_FB1) 501, a second differential stage feedback switch (SW_FB2) 502, a seventh source follower output switch (SW_SF7) 503, an eighth source follower output switch (SW_SF8) 504, a maximum value output line 505 and a minimum value output line 506. The maximum value output line 505 and the minimum value output line 506 are connected to different output terminals, and the signal processing apparatus 101 in this configuration has two output terminals.

The maximum value output line 505 is connected to the source of the maximum value output NMOS transistor 126 via the seventh source follower output switch 503. The minimum value output line 506 is connected to the source of the minimum value output PMOS transistor 127 via the eighth source follower output switch 504.

Figure 7:
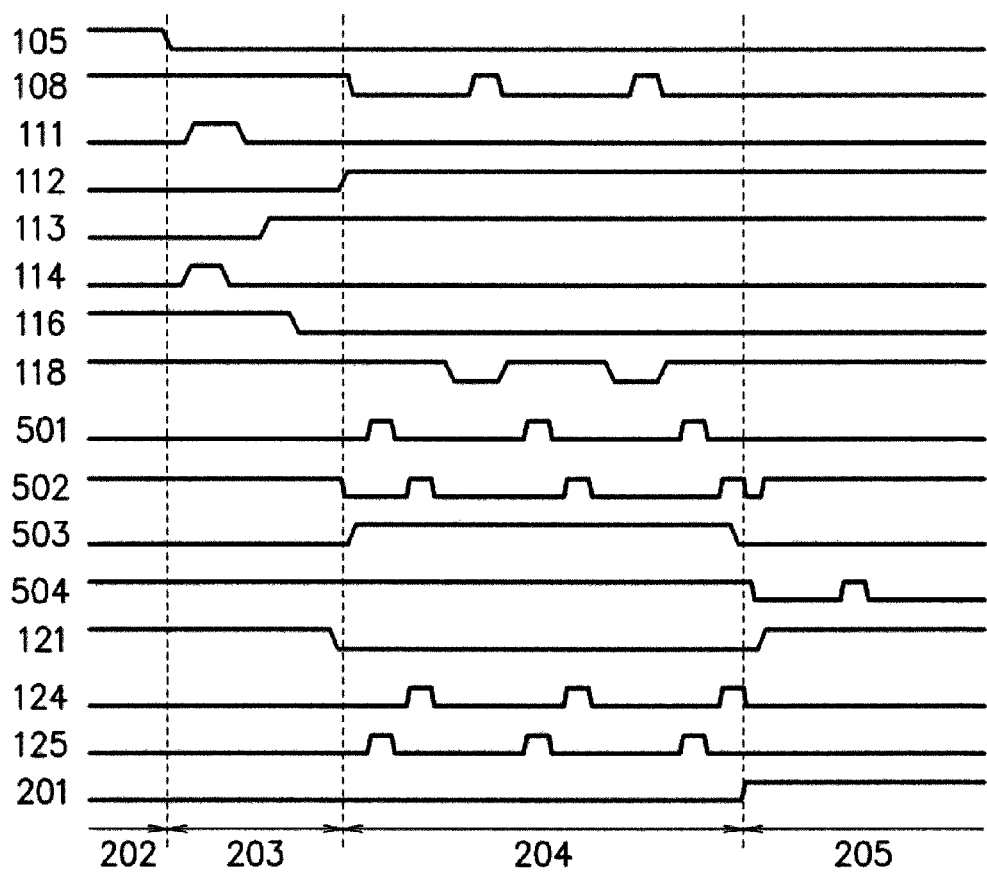
FIG. 7 is a timing chart illustrating the solid-state imaging apparatus according to the third embodiment of the present invention.

FIG. 7 is a diagram illustrating a driving timing of the circuit of FIG. 6. Similarly to the first embodiment, in the reset period 202 and the offset cancel period 203, the source follower MOS transistor which is used in the read out period is turned on. In the present embodiment, the second differential stage feedback switch 502 and the eighth source follower output switch 504 are turned on. In the accumulation period 204, in the time period of outputting the maximum value, the first differential stage feedback switch 501, the seventh source follower output switch 503 and the second load current circuit 125 are turned on, and the maximum value is output from the maximum value output line 505. Similarly, in the time period of outputting the minimum value, the second differential stage feedback switch 502, the eighth source follower output switch 504 and the first load current circuit 124 are turned on, and the minimum value is output from the minimum value output line 506.

Here, in the configurations of the first and the second embodiments, the maximum value and the minimum value are alternately output in the same output line. However, in the present embodiment, the maximum value and the minimum value are output from the output lines 505 and 506 which are different. Accordingly, only the maximum value is always output in the maximum output line 505, for example, and therefore, the voltage variation of the maximum value output line 505 can be suppressed as compared with the first embodiment. The same thing applies to the minimum value output line 506. As a result, the charge amount which is charged and discharged with respect to the parasitic capacitance of the output line can be reduced, and therefore, the current consumption can be suppressed at the time of a high-speed operation.

As described above, the differential stage and the clamp capacitor 115 of the peak amplifier and the bottom amplifier of the signal processing apparatus 101 are commonly owned, and the maximum value and the minimum value are alternately output in the different time periods in the accumulation period 204, whereby the layout area and the current consumption can be reduced. Further, by adopting this configuration, current consumption also can be suppressed at the time of a high-speed operation.

Fourth Embodiment

FIG. 8 is a block diagram illustrating a configuration example of a fourth embodiment of the present invention with the solid-state imaging apparatus (AF sensor) of the first to third embodiments being applied to an integrated circuit for use in focusing detection by a phase difference detection method. In FIG. 8, the fourth embodiment includes a logic block 701 for generating timing signals of an external interface and the entire sensor, a solid-state imaging apparatus (AF sensor (L1A)) 702 including a photoelectric conversion unit configured by a plurality of photoelectric conversion elements, a solid-state imaging apparatus (AF sensor (L1B)) 703, which corresponds to one distance measuring point with the solid-state imaging apparatus 702, a solid-state imaging apparatus (AF sensor (L23A)) 704, a solid-state imaging apparatus (AF sensor (L24B)) 705 and a solid-state imaging apparatus (AF sensor)) block 706. The present embodiment has, for example, 23 pairs of solid-state imaging apparatuses (AF sensors) in total.

The embodiment also includes a first AGC circuit 712, a second AGC circuit 713, a third AGC circuit 714 and a fourth AGC circuit 715, and the maximum values and the minimum values of 23 pairs of solid-state imaging apparatuses (AF sensors) are transmitted to the first AGC circuit 712 to the fourth AGC circuit 715 by time division. Each of the AGC circuits sequentially performs accumulation control, and thereby, the number of AGC circuits is reduced. A reference voltage and current generator circuit 716, a thermometer circuit 717, an AF gain circuit 718, an output multiplexer 719 and an analog circuit block 720 are also included.

An integrated circuit 721 is used in a focus detecting apparatus. The embodiment also includes a serial communication terminal 722, a reference voltage output terminal 723, a diode connection terminal 724 for an external thermometer, and an analog signal output terminal 725.

FIG. 8 does not illustrate connection information, but the logic block 701 controls the driving timing of the circuits of 706 by external serial communication. The signals of the AF sensor block 706 are subjected to accumulation control with the first AGC circuit 712 to the fourth AGC circuit 715, and an accumulation completion signal is transmitted to the logic block 701. Further, gains are applied to the signals of the AF sensor block 706 in the AF gain circuit 718, and are taken out from the analog signal output terminal 725 through the output multiplexer 719. The reference voltage and the reference current which are generated in the reference voltage and current generator circuit 716 are supplied to the logic block 701 and the AF sensor block 706. Some of the signals can be taken out from the serial communication terminal 722, or the analog signal output terminal 725 through the output multiplexer 719.

Fifth Embodiment

FIG. 9 illustrates a configuration example of a camera system according to a fifth embodiment of the present invention, which is, for example, a system in which the integrated circuit described in the fourth embodiment is incorporated into a digital camera. A barrier 801 functions as both a protect for a lens which will be described later and a main switch. A lens 802 forms an optical image of a subject on a solid-state imaging apparatus 804. An iris 803 is for regulating a light amount passing through the lens. The first solid-state imaging apparatus 804 takes in the subject of which image is formed by the lens as an image signal. A focus detecting apparatus 805 is provided with the second solid-state imaging apparatus (AF sensor) described in the first to third embodiments and a color temperature sensor, or the integrated circuit of the third embodiment.

An imaging signal processing apparatus 806 performs signal processing for signals output from the solid-state imaging apparatus 804 and the focus detecting apparatus 805. An A/D converter 807 performs analog/digital conversion of the signals output from the imaging signal processing apparatus

806. A signal processing unit 808 performs various corrections for image data output from the A/D converter 807, and compresses the data.

A memory unit 809 is for temporarily storing an image data. An external I/F circuit 810 is for communicating with an external computer and the like. A timing generating unit 811 outputs various timing signals to the signal processing unit 808 and the like. An overall control/processing unit 812 performs various processing and controls the entire camera. A recording medium control I/F unit 813 is also included. A recording medium 814 is attachable and detachable recording medium and is a semiconductor memory or the like for recording to or reading out from the recording medium. An external computer 815 is also illustrated.

Next, an operation at the time of photographing of the above described digital camera will be described. When the barrier 801 is opened, the main power supply is turned on, and next, the power supply of the control system is turned on. Further, the power supply of the imaging system circuit such as the A/D converter 807 is turned on. Next, based on the signal output from the focus detecting apparatus 805, the overall control/processing unit 812 calculates the distance to a subject by phase difference detection as described above. Thereafter, the overall control/processing unit 812 drives the lens 802 and determines whether or not the lens 802 focuses, and when determining the lens 802 does not focus, it drives the lens 802 again and performs auto focusing control. Next, after focusing is confirmed, actual exposure is started. When the exposure is finished, the image signal output from the solid-state imaging apparatus 804 is subjected to analog/digital conversion in the A/D converter 807, goes through the signal processing unit 808, and is written into the memory unit 809 by the overall control/processing unit 812. Thereafter, the data accumulated in the memory unit 809 goes through the recording medium control I/F unit 810 by the control of the overall control/processing unit 812 and is recorded in the recording medium 814 which is attachable and detachable. Further, the data may be directly input to a computer or the like through the external I/F unit 810.

According to the first to fifth embodiments, the differential stage of the peak amplifier and the bottom amplifier of the signal processing apparatus 101 and the clamp capacitor 115 are commonly owned, and the maximum value and the minimum value are alternately output in the different time periods during the accumulation period 204, whereby the layout area and current consumption can be reduced. As a result, the compact auto focusing sensor with lower power consumption can be provided.

Each of the solid-state imaging apparatuses of the first to fourth embodiments has the pixel region 102 in which a plurality of pixels each having the photoelectric conversion unit (photodiode) 106 are disposed one-dimensionally or two-dimensionally. A plurality of read out circuits each have the first signal holding unit 103 and the amplifier circuit 128, and read out the pixel output signal from the pixel in the pixel region 102. The signal output line 123 is the common signal output line connected to a plurality of read out circuits via the switch units 122, 503 and 504. The first load unit 124 is connected to between the signal output line 123 and the positive power source. The second load unit 125 is connected to between the signal output line 123 and the ground power source. The maximum value output unit (detection circuit) forms a part of each of a plurality of read out circuits, and outputs the maximum value of a plurality of pixel signals which are input to the read out circuit. The minimum value output unit (detection circuit) forms a part of each of a plurality of read out circuits, and outputs the minimum value of a plurality of pixel signals which are input to the read out circuit. The output signals from the maximum value output unit and the minimum value output unit are output to the common signal output line or separate signal output lines. In FIG. 2, the common signal output line 123 is illustrated, and in FIG. 6, the separate signal output lines 505 and 506 are illustrated. During the pixel signal accumulation period 204 of FIGS. 3, 5 and 7, the switching units 119, 120, 124 and 125 switch the output from the maximum value output unit and the output from the minimum value output unit.

The maximum value output unit has the NMOS transistor 126 or the NPN transistor connected serially between the positive power source and the signal output line 123, and the first switch 119. The minimum value output unit has the PMOS transistor 127 or the PNP transistor connected serially between the ground power source and the signal output line 123, and the second switch 120.

The maximum value output unit configures the source follower circuit or the emitter follower circuit with the first load unit 124. The minimum value output unit configures the source follower circuit or the emitter follower circuit with the second load unit 125.

As shown in FIGS. 3, 5 and 7, in the period in which neither the output signal from the maximum value output unit nor the output signal from the minimum value output unit is output from the signal output line 123, the driving current source 118 of the amplifier circuit in the read out circuit is turned off.

The read out circuit has a plurality of the first signal holding units 103 holding output signals of a plurality of pixels. One or more second signal holding units 901 is or are connected to the signal output line 123. The control unit has the PB processing unit 902, the comparator 903, the logic block 701 and the reference voltage and current generator circuit 716. The control unit controls holding of the first signal holding unit 103 by the switch 108 by using the difference between the output signal of the maximum value output unit and the output signal of the minimum value output unit which are output from the signal output line 123 in the different time periods.

The first signal holding unit 103 holds the output signals of the pixels by turning off the switch 108 when outputting the output signal from the maximum value output unit to the signal output line 123 and when outputting the output signal from the minimum value output unit to the signal output line 123.

The camera system of the fifth embodiment (FIG. 9) has the solid-state imaging apparatus 805 of any of the first to fourth embodiments, the lens 802 which gathers incident light onto the solid-state imaging apparatus 805, and the driving signal generating circuit (timing generating unit) 811 which gives a driving signal to the solid-state imaging apparatus 805.

According to the first to fifth embodiments, by switching the output from the maximum value output unit and the output from the minimum value output unit during the pixel signal accumulation period 204, the layout area and the current consumption can be reduced. As a result, the compact solid-state imaging apparatus with low power consumption can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-304491, filed Nov. 28, 2008, which is hereby incorporated by reference herein in its entirety.

What is claimed is:

1. A solid-state imaging apparatus comprising:
   a plurality of photoelectric conversion units;
   a plurality of read out circuits arranged correspondingly to each of the plurality of photoelectric conversion units, wherein each of the plurality of read out circuits includes a maximum value output unit for outputting a maximum value among a plurality of pixel signals input to the readout circuits from the corresponding photoelectric conversion units, and a minimum value output unit for outputting a minimum value among a plurality of pixel signals input to the readout circuits from the corresponding photoelectric conversion units;
   a signal output line connected commonly to outputs of the plurality of read out circuits; and
   a switching unit for switching between an output from the maximum value output unit and an output from the minimum value output unit, during a period of accumulating a pixel signal.

2. The solid-state imaging apparatus according to claim 1, wherein
   the maximum value output unit includes an NMOS transistor or an NPN transistor connected serially between a positive power source and the signal output line, and a first switch, and
   the minimum value output unit includes a PMOS transistor or a PNP transistor connected serially between a ground power source and the signal output line, and a second switch.

3. The solid-state imaging apparatus according to claim 2, wherein
   each of the read out circuits includes a first load unit connected to the signal output line and the ground power source, and a second load unit connected to the signal output line and the positive power source,
   the maximum value output unit forms, together with the first load unit, a source follower circuit or an emitter follower circuit, and
   the minimum value output unit forms, together with the second load unit, a source follower circuit or an emitter follower circuit.

4. The solid-state imaging apparatus according to claim 1, wherein
   during a period of outputting neither of the output signals from the maximum value output unit and the minimum value output unit through the signal output line, a driving current source of an amplifier circuit in the readout circuit is turned off.

5. The solid-state imaging apparatus according to claim 1, wherein
   the readout circuit has a first signal holding unit for holding output signal from the corresponding photoelectric conversion unit.

6. The solid-state imaging apparatus according to claim 1, further comprising:
   one or more signal holding units including a first signal holding unit connected to the signal output line, and
   a control unit for controlling a holding operation of the first signal holding unit, based on a difference between an output signal of the maximum value output unit and an output signal of the minimum value output unit, derived from the signal output line during different periods.

7. The solid-state imaging apparatus according to claim 5, wherein
   the first signal holding unit holds output signal from the corresponding photoelectric conversion unit, at a time of outputting to the signal output line the output signal from the maximum value output unit or the minimum value output unit.

8. The camera system comprising:
   a solid-state imaging apparatus according to claim 1;
   a lens for focusing an incident light onto the solid-state imaging apparatus;
   a driving signal generator circuit for supplying a driving signal to the solid-state imaging apparatus.

* * * * *